(12) United States Patent
Hosotani et al.

(10) Patent No.: US 10,352,633 B2
(45) Date of Patent: Jul. 16, 2019

(54) FLOW PASSAGE CONNECTING APPARATUS FOR HEAT EXCHANGER

(71) Applicant: EBARA CORPORATION, Tokyo (JP)

(72) Inventors: Kazumasa Hosotani, Tokyo (JP); Toyoji Shinohara, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 843 days.

(21) Appl. No.: 14/520,681

(22) Filed: Oct. 22, 2014

(65) Prior Publication Data

US 2015/0115600 A1 Apr. 30, 2015

(30) Foreign Application Priority Data

Oct. 25, 2013 (JP) .................. 2013-221856

(51) Int. Cl.
| | |
|---|---|
| *F16L 13/02* | (2006.01) |
| *F28F 21/00* | (2006.01) |
| *F28F 9/02* | (2006.01) |
| *F28F 21/06* | (2006.01) |
| *F28D 7/16* | (2006.01) |
| *F28F 9/00* | (2006.01) |

(52) U.S. Cl.
CPC .............. *F28F 21/00* (2013.01); *F16L 13/02* (2013.01); *F28D 7/16* (2013.01); *F28F 9/00* (2013.01); *F28F 9/0246* (2013.01); *F28F 21/062* (2013.01); *F28F 21/067* (2013.01); *F28F 2230/00* (2013.01)

(58) Field of Classification Search
CPC ....... F28F 9/0246; F28F 9/0248; F28F 9/0251
USPC ........................................... 285/124.3, 124.2
See application file for complete search history.

(56) References Cited

U.S. PATENT DOCUMENTS

| | | |
|---|---|---|
| 3,363,680 A | 1/1968 | Baker |
| 3,804,161 A | 4/1974 | Nowak |
| | (Continued) | |

FOREIGN PATENT DOCUMENTS

| | | |
|---|---|---|
| CN | 2549302 Y | 5/2003 |
| CN | 103282712 A | 9/2013 |
| | (Continued) | |

OTHER PUBLICATIONS

Extended European Search Report for Application No. 14189709.0 dated Apr. 7, 2015.

*Primary Examiner* — David Bochna
*Assistant Examiner* — James A Linford
(74) *Attorney, Agent, or Firm* — Pearne & Gordon LLP

(57) ABSTRACT

A flow passage connecting apparatus for a heat exchanger includes a boss formed of a resin material in a columnar shape and having a plurality of through-holes for each receiving from one side one end of a heat exchanger tube made of a resin material, and a coupler made of a resin material and having a body portion formed in a circular cylindrical shape. The body portion is configured to receive therein a part of the boss on the other side opposite to the one side and to be connected to the boss by at least one of threaded engagement and full-circle welding. The connecting apparatus further includes first and second seal structures sealing between the boss and the body portion. The body portion has a communication hole formed at a position between the first and second seal structures to communicate between an inside and outside of the body portion.

12 Claims, 7 Drawing Sheets

(56) References Cited

U.S. PATENT DOCUMENTS

| | | | | |
|---|---|---|---|---|
| 4,079,967 A | * | 3/1978 | Schoessow | G21C 13/036 285/47 |
| 4,422,675 A | * | 12/1983 | Norris | F02C 7/222 285/123.1 |
| 2008/0264617 A1 | * | 10/2008 | Martin | F28D 7/0066 165/154 |
| 2010/0289225 A1 | * | 11/2010 | Lafleur | E21B 17/006 277/314 |
| 2011/0198063 A1 | | 8/2011 | Meyer | |
| 2013/0330065 A1 | | 12/2013 | Schwarzkopf et al. | |

FOREIGN PATENT DOCUMENTS

| | | |
|---|---|---|
| DE | 10 2007 062826 A1 | 9/2008 |
| JP | S63-36882 U | 3/1988 |
| JP | 3-128277 U | 12/1991 |

* cited by examiner

FLOW PASSAGE CONNECTING APPARATUS FOR HEAT EXCHANGER

TECHNICAL FIELD

The present invention relates to a flow passage connecting technique for heat exchangers made of resin material.

BACKGROUND ART

Heat exchangers made of resin material are superior in corrosion resistance and heat resistance but inferior in mechanical strength to metallic heat exchangers. Among resin materials, fluorocarbon resin is particularly excellent in corrosion resistance and heat resistance, but the mechanical strength thereof is relatively low. This means that a heat exchanger made of fluorocarbon resin cannot be used unless the supply fluid pressure is lowered below a predetermined level, which is one of the causes of narrowing the range of use of fluorocarbon-resin heat exchangers. To supply industrial circulating water into a heat exchanger, for example, a return pressure higher than a predetermined level needs to be ensured for the circulating water; therefore, the supply fluid pressure cannot be reduced considerably. For this reason, fluorocarbon-resin heat exchangers cannot be used unless some measures are taken to improve pressure resistance.

To improve the pressure resistance of a heat exchanger made of fluorocarbon resin, it is particularly important to improve the pressure resistance of the joint at the distal end of the heat exchanger. A flange joint structure and a threaded joint structure are generally known as examples of heat exchanger distal end joint structures capable of improving pressure resistance. The flange joint structure is capable of improving pressure resistance relatively easily but results unavoidably in an increased size of the joint. The threaded joint structure, on the other hand, allows the joint to become relatively small in size but frequently includes a packing or O-ring installed in the joint. In this case, if the packing or O-ring should become deteriorated, the fluid flowing through the heat exchanger may leak. The deterioration of the packing or O-ring disposed in the joint cannot be confirmed from the outside. Therefore, it is necessary, in order to surely avoid fluid leakage, to replace the packing or O-ring very frequently, or to perform inspection by disassembling the joint. Thus, the threaded joint structure is inferior in maintainability. Basically, an effective way to improve the mechanical strength of the threaded joint structure is to increase the wall thickness of the coupler, which, however, causes an increase in size of the coupler and hence leads to an increase in cost.

SUMMARY

A first embodiment of the present invention is provided as a flow passage connecting apparatus for a heat exchanger. The connecting apparatus includes a boss formed of a resin material in a columnar shape extending in one direction and having a plurality of through-holes for each receiving from one side one end of a heat exchanger tube made of a resin material, a coupler made of a resin material and having a body portion formed in a circular cylindrical shape extending in the one direction to receive therein a part of the boss on the other side opposite to the one side, the body portion being connected to the boss by at least one of threaded engagement and full-circle welding, a first seal structure sealing between the boss and the body portion, and a second seal structure sealing between the boss and the body portion at a position closer to the one side than the first seal structure. The body portion has a communication hole formed at a position between the first and second seal structures to communicate between the inside and outside of the body portion.

DESCRIPTION OF EMBODIMENTS

Figure 1:
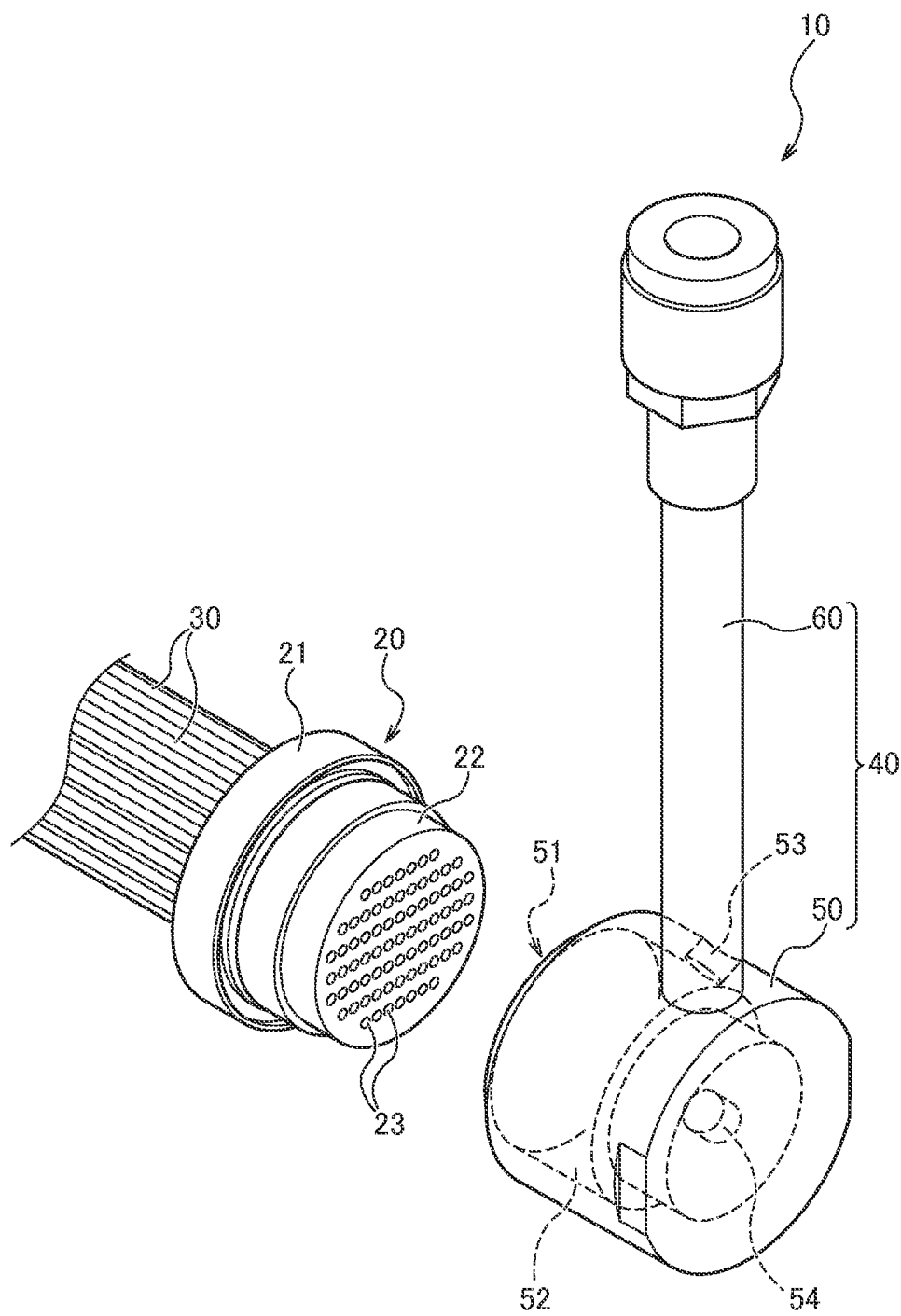
FIG. 1 is a perspective view schematically showing a connecting apparatus as a first embodiment of the present invention.

A first embodiment of the present invention is provided as a flow passage connecting apparatus for a heat exchanger. The connecting apparatus includes a boss formed of a resin material in a columnar shape extending in one direction and having a plurality of through-holes for each receiving from one side one end of a heat exchanger tube made of a resin material, a coupler made of a resin material and having a body portion formed in a circular cylindrical shape extending in the one direction to receive therein a part of the boss on the other side opposite to the one side, the body portion being connected to the boss by at least one of threaded engagement and full-circle welding, a first seal structure sealing between the boss and the body portion, and a second seal structure sealing between the boss and the body portion at a position closer to the one side than the first seal structure. The body portion has a communication hole formed at a position between the first and second seal structures to communicate between the inside and outside of the body portion.

The above-described connecting apparatus can be used with the communication hole sealed. The connecting apparatus is compact because the boss and the body portion of the coupler can be connected by insertion attachment. Further, the connecting apparatus can ensure pressure resistance appropriately because the boss and the body portion of the coupler are connected by at least one of threaded engagement and full-circle welding. Further, the connecting apparatus is excellent in seal reliability because the area between the boss and the body portion of the coupler is dual-sealed with the first and second seal structures. Further, the connecting apparatus allows inspection of the sealing performance of the first and second seal structures by opening the sealed communication hole. Upon performing the inspection, it is unnecessary to disconnect the boss and the body portion of the coupler from each other. Accordingly, the connecting apparatus is also excellent in maintainability. More specifically, by opening the communication hole, it is possible to visually check whether or not there is a leakage due to deterioration of the first seal structure. It is also possible to check the sealing performance of the first and second seal structures by pumping a fluid into the space between the first and second seal structures in the coupler through the communication hole with a pump connected thereto and measuring the fluid pressure in the space between the first and second seal structures (this process will hereinafter be referred occasionally to as "pressurization test").

According to a second embodiment of the present invention, the connecting apparatus described in the first embodiment is configured as follows. The boss has a first thread formed on the outer surface thereof. The body portion has a second thread formed on the inner surface thereof. The second thread is thread-engaged with the first thread when the body portion receives the part of the boss on the other side. According to the second embodiment of the present invention, pressure resistance is improved because the boss and the body portion of the coupler can be connected by threaded engagement.

According to a third embodiment of the present invention, the second seal structure described in the first or second embodiment is a structure in which the boss and the body portion are joined by full-circle welding. According to the third embodiment of the present invention, the connection between the boss and the body portion of the coupler becomes strong because the boss and the body portion are joined by full-circle welding. In other words, because it is unnecessary to ensure a large wall thickness for the coupler, the coupler can be reduced in size. Further, seal reliability is improved because the seal structure formed by full-circle welding is hardly deteriorated.

According to a fourth embodiment of the present invention, the first seal structure described in any one of the first to third embodiments has a seal member disposed between the body portion and an end surface of the boss on the other side in the one direction. According to the fourth embodiment of the present invention, the liquid flowing through the heat exchanger tubes and the interior of the coupler cannot enter the space between the boss and the inner peripheral surface of the body portion. Accordingly, there will be no such a situation that the liquid enters the space between the boss and the inner peripheral surface of the body portion and, consequently, the hydraulic pressure acts on the inner surface of the body portion radially outward, causing the body portion to be expanded radially. As a result, it is possible to eliminate or reduce the likelihood of the boss and the body portion being disconnected from each other by the expansion of the body portion.

According to a fifth embodiment of the present invention, the first seal structure described in any one of the first to third embodiments has a seal member disposed between the body portion and the boss in a direction perpendicular to the one direction. According to the fifth embodiment of the present invention, there is no counterforce acting on the boss, which would otherwise be produced by pressing the seal member in the one direction to effect sealing. That is, it is possible to reduce the force acting in a direction for disconnecting the boss and the body portion from each other. Accordingly, the connection between the boss and the body portion becomes stronger, and pressure resistance is improved.

According to a sixth embodiment of the present invention, the first seal structure described in the fifth embodiment including at least the second embodiment is disposed closer to the other side than the first thread and the second thread. According to the sixth embodiment of the present invention, the liquid flowing through the heat exchanger tubes and the interior of the coupler cannot enter the space between the first and second threads and the vicinity thereof. Accordingly, such a situation will not occur that the liquid enters the area between the first and second threads, causing the second thread to be increased in diameter by the hydraulic pressure. As a result, it is possible to eliminate or reduce the likelihood of the boss and the body portion being disconnected from each other by the expansion of the second thread.

According to a seventh embodiment of the present invention, the connecting apparatus described in any one of the first to sixth embodiments further includes an annular reinforcing member provided in the body portion or around the outer periphery of the body portion to reinforce the rigidity of the body portion. According to the seventh embodiment of the present invention, the rigidity of the body portion is reinforced so that the body portion is hardly deformable. Therefore, even if the liquid flowing through the heat exchanger tubes and the interior of the coupler enters the space between the boss and the inner peripheral surface of the body portion, it is possible to eliminate or reduce the likelihood of the body portion being expanded radially to cause the boss and the body portion to be disconnected from each other. In a case where the seventh embodiment is applied to the fourth or sixth embodiment, the above-described advantage of the seventh embodiment is offered when there is a leakage of liquid due to deterioration of the first seal structure.

According to an eighth embodiment of the present invention, the communication hole described in any one of the first to seventh embodiments includes a first communication hole and a second communication hole. The first communication hole and the second communication hole are formed at circumferentially different positions, respectively. According to the eighth embodiment of the present invention, when a pressurization test is carried out in such a manner that a pump is connected to one of the first and second communication holes that is located relatively below the other to deliver a liquid into an area between the first and second seal structures in the coupler, the other communication hole, which is located relatively above the one of the first and second communication holes can be used as an air vent. Accordingly, the area between the first and second seal structures in the coupler can be completely filled with the liquid, and thus the accuracy of the pressurization test is improved. Hereinafter, more specific embodiments will be described.

A. First Embodiment

FIG. 1 is a perspective view schematically showing the configuration of a connecting apparatus 10 as a first embodiment of the present invention. The connecting apparatus 10 is an apparatus for connecting flow passages in a heat exchanger and includes a boss 20 and a coupler 40. In this embodiment, the boss 20 and the coupler 40 are made of fluorocarbon resin and hence very excellent in corrosion resistance and heat resistance. Examples of such fluorocarbon resin include PFA (tetrafluoroethylene perfluoroalkyl vinyl ether copolymer) and PTFE (polytetrafluoroethylene). It should, however, be noted that the material constituting the connecting apparatus 10 is not limited to fluorocarbon resin, and that the connecting apparatus 10 may be formed using any resin material having desired corrosion resistance and heat resistance, e.g. PP (polypropylene), urethane, vinyl chloride, etc.

The boss 20 has a columnar shape extending in one direction (hereinafter occasionally referred to as the "predetermined direction"). The boss 20 has a first part 21 and a second part 22 smaller in outer diameter than the first part 21. The first and second parts 21 and 22 have a plurality of through-holes 23 extending therethrough in the predetermined direction. In the first part 21, one end of each of heat exchanger tubes 30 is inserted into each of the through-holes 23 in one-to-one relation and welded thereto on the boss 20 side in the direction of the positional relationship between the boss 20 and the coupler 40 (the term "boss 20 side in the direction of the positional relationship between the boss 20 and the coupler 40" will hereinafter occasionally be referred to as simply the "boss side"). Because the through-holes 23 extend through the boss 20, a plurality of flow passages formed by the heat exchanger tubes 30 join into one flow passage at the outlet of the boss 20, i.e. at an end of the second part 22 on the coupler 40 side in the direction of the positional relationship between the boss 20 and the coupler 40 (the term "coupler 40 side in the direction of the positional relationship between the boss 20 and the coupler 40" will hereinafter occasionally be referred to as simply the "coupler side"). A liquid flows through the heat exchanger tubes 30.

The coupler 40 includes a body portion 50 and a tube portion 60. The body portion 50 has a circular cylindrical shape extending in the predetermined direction. The body portion 50 has an internal space 52 therein. The boss side end of the internal space 52 is open through an opening 51, and the coupler side end of the internal space 52 is closed. The body portion 50 has two communication holes 53 and 54 extending radially through the thickness thereof to allow communication between the inside of the body portion 50, i.e. the internal space 52, and the outside thereof. The communication holes 53 and 54 are formed at circumferentially different positions, respectively. In this embodiment, the communication holes 53 and 54 are disposed at an angle of 45° to each other in the circumferential direction. It should be noted that the number of communication holes may be one or three or more.

The tube portion 60 has one end thereof inserted into and joined to the body portion 50. Thus, the internal space 52 of the body portion 50 and the flow passage in the tube portion 60 are communicated with each other. The other end of the tube portion 60 is connected to the piping of the heat exchanger system.

In the connecting apparatus 10, the second part 22 of the boss 20 is received into the internal space 52 of the body portion 50 from the opening 51, thereby allowing the boss 20 and the coupler 40 to be connected to each other. In this embodiment, the boss 20 and the coupler 40 are connected by threaded engagement (FIG. 1 omits illustration of the threads). When the boss 20 and the coupler 40 are connected as stated above, the heat exchanger tubes 30 and the tube portion 60 communicate with each other through the through-holes 23 and the internal space 52. The connecting apparatus 10 constructed as stated above is used at each end of the bundle of heat exchanger tubes 30 to connect the flow passages of the liquid in one-to-plural relation.

Figure 2:
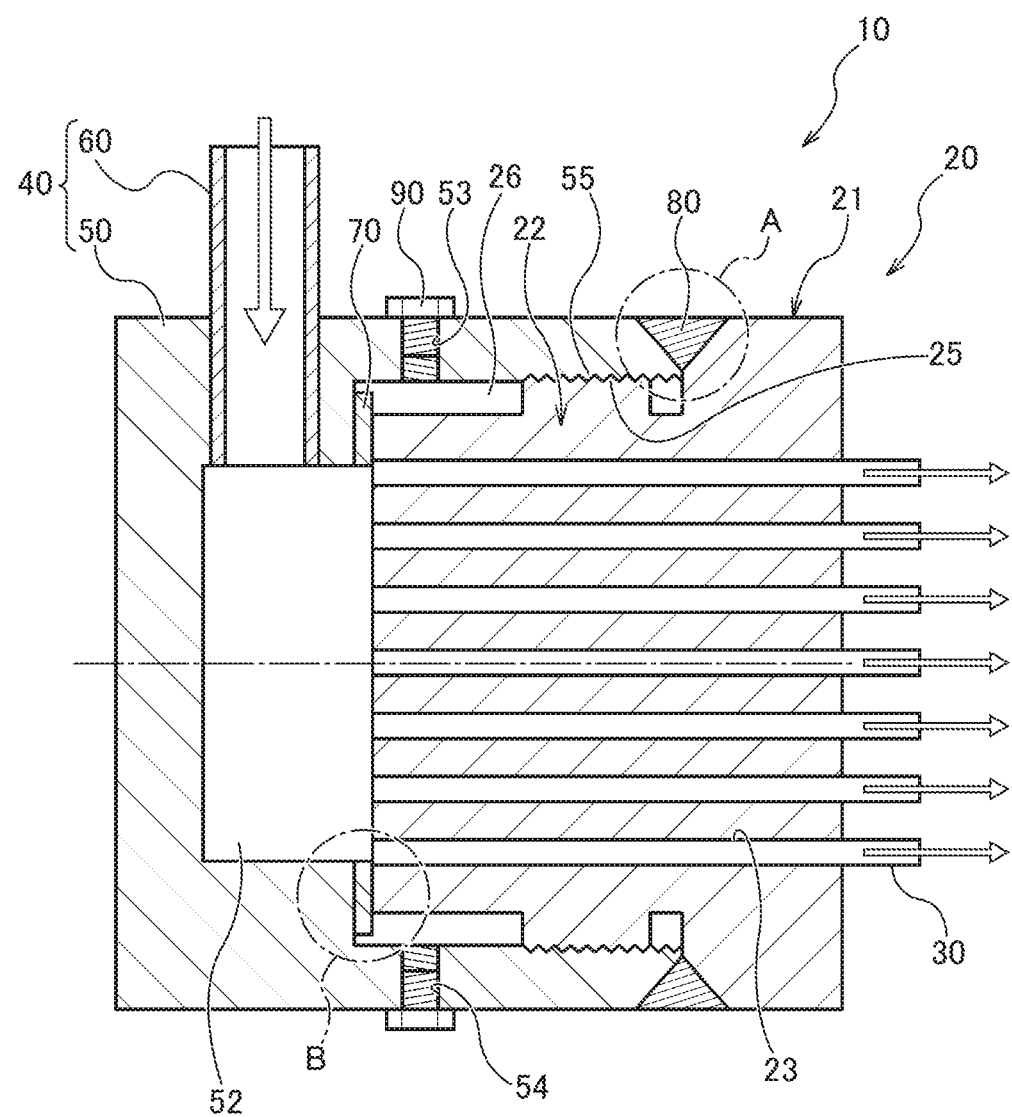
FIG. 2 is a sectional view schematically showing the connecting apparatus.

FIG. 2 shows the connecting apparatus 10 in a state where the boss 20 and the coupler 40 are connected to each other. In FIG. 2, the connecting apparatus 10 is shown such that the liquid flows into the heat exchanger tubes 30 from the tube portion 60 through the body portion 50 and the boss 20. When the connecting apparatus 10 is in use (i.e. when the heat exchanger is in an operative state), the communication holes 53 and 54 are sealed. In this embodiment, the body portion 50 has threads formed on wall surfaces thereof that form the communication holes 53 and 54. The communication holes 53 and 54 are sealed with seal tape (not shown) after threaded plugs 90 have been inserted into the communication holes 53 and 54, respectively. It should be noted that, in FIG. 2, the communication holes 53 and 54 are shown to be circumferentially spaced from each other at an angle of 180° in order to show both the communication holes 53 and 54 (in FIG. 1, the communication holes 53 and 54 are at an angle of 45° to each other).

The boss 20 has a first thread 25 formed on the outer peripheral surface of the second part 22. The body portion 50 has a second thread 55 formed on the inner peripheral surface thereof. The first thread 25 and the second thread 55 are thread-engaged with each other, thereby allowing the boss 20 and the body portion 50 to be connected by threaded engagement. When the boss 20 and the body portion 50 are connected to each other as stated above, the area between the boss 20 and the body portion 50 is dual-sealed with a first seal structure 70 and a second seal structure 80. The above-described communication holes 53 and 54 are formed between the first seal structure 70 and the second seal structure 80. In other words, the communication holes 53 and 54 are formed so as to communicate with an intermediate space 26 sealed by the first and second seal structures 70 and 80.

The first seal structure 70 may be formed by using various seal members. In this embodiment, the first seal structure 70 is a packing. However, the first seal structure 70 may be other seal member, e.g. an O-ring. In this embodiment, the first seal structure 70 is disposed between the body portion 50 and the coupler-side end surface of the boss 20 in the predetermined direction. Consequently, the first seal structure 70 is disposed closer to the coupler side than the first and second threads 25 and 55. The first seal structure 70 exhibits sealing performance appropriately by being crushed in the predetermined direction by pressing force resulting from threading the boss 20 into the body portion 50.

The second seal structure 80, in this embodiment, is constructed in the form of a weld where the boss 20 and the body portion 50 are joined together by full-circle welding. The full-circle welding enables the second seal structure 80 to be provided as a seal structure substantially free from deterioration. Thus, the seal reliability in long-term use is improved.

Figure 3A:
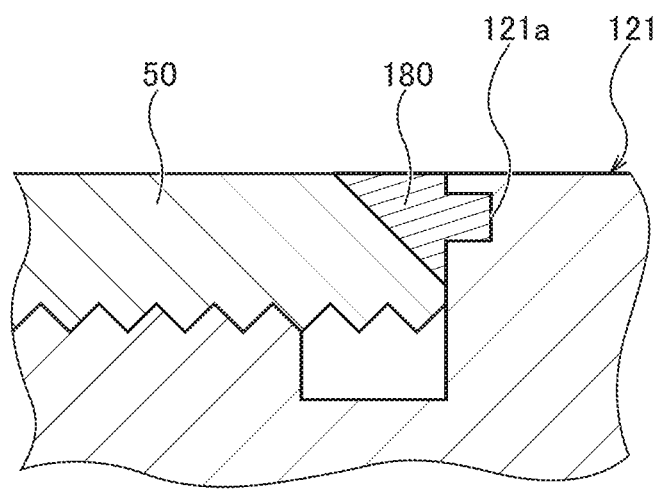
FIG. 3A is a fragmentary sectional view showing a modification of full-circle welding of a boss and a coupler.

FIG. 3A shows a modification of the part enclosed by the circle A in FIG. 2. A weld 180 between the body portion 50 and a first part 121 of the boss 20 as a modification may be configured as follows. The body portion 50 may be provided with a groove as shown in the figure. The first part 121 may be provided with a recess 121a. In the embodiment shown in FIG. 2, when both the body portion 50 and the first part 21 are formed using PFA, for example, the materials constituting the body portion 50 and the first part 21 completely melt into each other to form the second seal structure 80. Therefore, high reliability can be obtained for the seal structure. When the body portion 50 and the first part 21 are formed using different materials, i.e. when one of the body portion 50 and the first part 21 is formed of PTFE and the other of the two is formed of PFA, the weld strength depends on the surface area of the surfaces welded together. In such a case, the structure shown in FIG. 3A makes it possible to increase the surface area of the welded surfaces and hence possible to enhance the weld strength. When hot gas welding is used to form the weld 180, the recess 121a acts to prevent escape of heat applied by the hot gas; therefore, weld reliability can be improved.

Figure 3B:
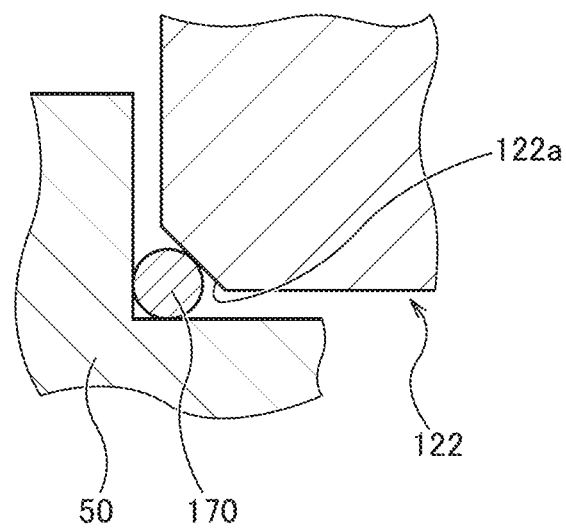
FIG. 3B is a fragmentary sectional view showing a modification of a seal structure.

FIG. 3B shows a modification of the part enclosed by the circle B in FIG. 2. A seal structure sealing between the body portion 50 and a second part 122 as a modification may be configured as follows. The second part 122 has a peripheral edge chamfered to form a chamfered portion 122a as shown in the figure. An O-ring 170 is disposed between the chamfered portion 122a and the corner of the body portion 50. With this configuration, the O-ring 170 cannot easily be dislodged; therefore, the seal structure is improved in reliability. The above-described chamfered structure may be replaced by a structure in which either the body portion 50 or the second part 122 has an O-ring groove.

According to the above-described connecting apparatus 10, the boss 20 and the body portion 50 of the coupler 40 can be connected to each other by insertion attachment. Therefore, the connecting apparatus 10 is compact in size. In addition, the second seal structure 80 can be formed by performing full-circle welding on the boss 20 and the body portion 50 having been thread-engaged with each other to fix the positional relationship thereof. Therefore, the welding operation can be carried out easily. Further, because the boss 20 and the body portion 50 are connected by both threaded engagement and full-circle welding, the connecting apparatus 10 exhibits very high joint strength and excellent pressure resistance. In addition, because joint strength can be ensured appropriately even if the wall thickness of the body portion 50 is small, the body portion 50 can be reduced in size. Moreover, because the area between the boss 20 and the body portion 50 is dual-sealed with the first seal structure 70 and the second seal structure 80, the seal reliability is very high. In other words, even if the sealing performance of the first seal structure 70 becomes degraded owing to deterioration and, consequently, the liquid flows from the internal space 52 into the intermediate space 26, the area between the boss 20 and the body portion 50 is reliably sealed with the second seal structure 80, which will not become deteriorated semipermanently. Therefore, it is possible to prevent or reduce the leakage of liquid to the outside.

Further, because the connecting apparatus 10 has the communication holes 53 and 54 formed between the first seal structure 70 and the second seal structure 80, it is possible to inspect the sealing performance of the first and second seal structures 70 and 80. More specifically, the sealing performance inspection can be performed by either of the following two methods, i.e. a first method and a second method. The first method includes opening at least one of the communication holes 53 and 54 by removing the associated plug 90. When the sealing performance of the first seal structure 70 has become degraded owing to deterioration and the fluid is leaking from the internal space 52 into the intermediate space 26, the fluid accumulates in the intermediate space 26. In such a case, the first method enables the leakage of fluid to be visually confirmed through the opened communication hole 53 or 54. The second method includes performing a pressurization test.

Figure 4:
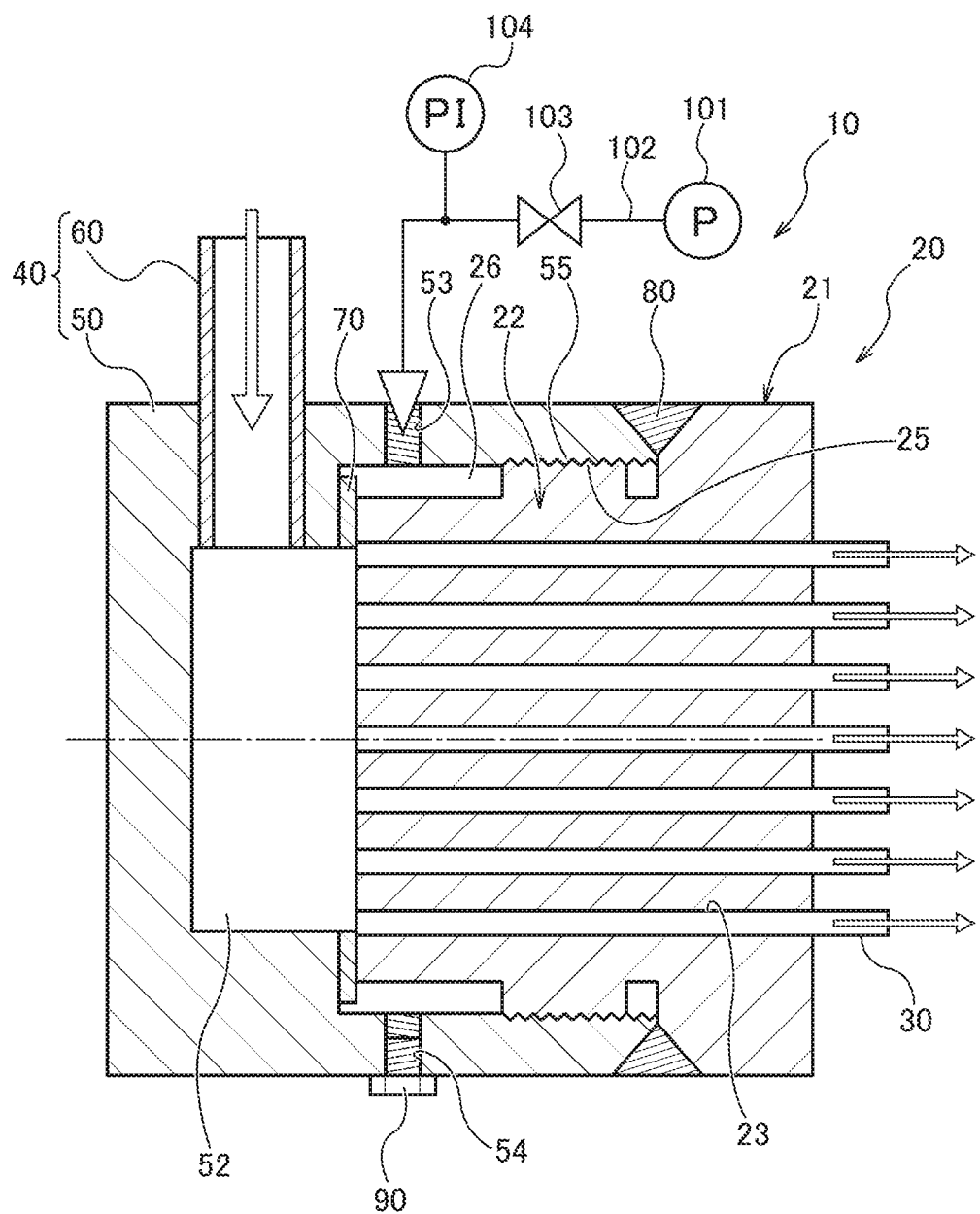
FIG. 4 is an explanatory view showing a method of pressurization test.

FIG. 4 shows an example of the pressurization test. In the illustrated example, the communication hole 53 is opened, and a pump 101 is connected to the communication hole 53 through piping 102. The piping 102 is connected with a valve 103 and a pressure gauge 104. In the pressurization test, the pump 101 is operated in the above-described state to deliver water into the intermediate space 26 and to apply a pressure thereto, and the valve 103 is closed. Thereafter, the results of measurement with the pressure gauge 104 are observed for a predetermined period of time. According to the second method, when there is a leakage in at least one of the first and second seal structures 70 and 80, the measured value on the pressure gauge 104 gradually reduces. Therefore, the leakage can be confirmed.

If the above-described two methods are combined together, it is also possible to specify which one of the first and second seal structures 70 and 80 is leaking. For example, when no leakage is found by the first method but leakage is confirmed by the second method, it is possible to specify that the leaking point is in the second seal structure 80. These methods enable the sealing performance of the first and second seal structures 70 and 80 to be inspected without the need to disconnect the boss 20 and the body portion 50 from each other and are therefore excellent in maintainability.

In this embodiment, the body portion 50 has two communication holes 53 and 54; therefore, the pressurization test can also be carried out as follows. First, both the two communication holes 53 and 54 are opened. Next, the pump 101 is connected to one of the communication holes 53 and 54 that is located relatively below the other (the communication hole 54 in the example shown in FIG. 4). Next, the pump 101 is operated to check for leakage in the same way as the above-described method. In this method, the communication hole 53, which is located relatively above the communication hole 54, functions as an air vent. That is, when the intermediate space 26 is filled with a liquid by the pump 101, the air present in the intermediate space 26 is all discharged to the outside through the communication hole 53. This method makes it possible to increase the hydraulic pressure in the intermediate space 26 and hence possible to improve the test accuracy. It should be noted that, with the above-described method in which only the communication hole 53 is opened, a gas may be delivered into the intermediate space 26 in place of a liquid.

Further, according to the connecting apparatus 10, the first seal structure 70 is disposed between the body portion 50 and the coupler-side end surface of the boss 20 in the predetermined direction (i.e. in the direction in which the boss 20 and the body portion 50 extend). Therefore, the liquid cannot enter the intermediate space 26 between the boss 20 and the inner peripheral surface of the body portion 50. Accordingly, there will be no such a situation that the liquid enters the intermediate space 26 and, consequently, the hydraulic pressure acts on the inner surface of the body portion 50 radially outward, causing the body portion 50 to be expanded radially. As a result, it is possible to eliminate or reduce the likelihood of the connection between the first and second threads 25 and 55 being loosened by the expansion of the body portion 50, resulting in the boss 20 and the body portion 50 being disconnected from each other. This advantage is offered not only when the boss 20 and the body portion 50 are connected by threaded engagement but also when the boss 20 and the body portion 50 are connected simply by fitting them together without threaded engagement.

Figure 5:
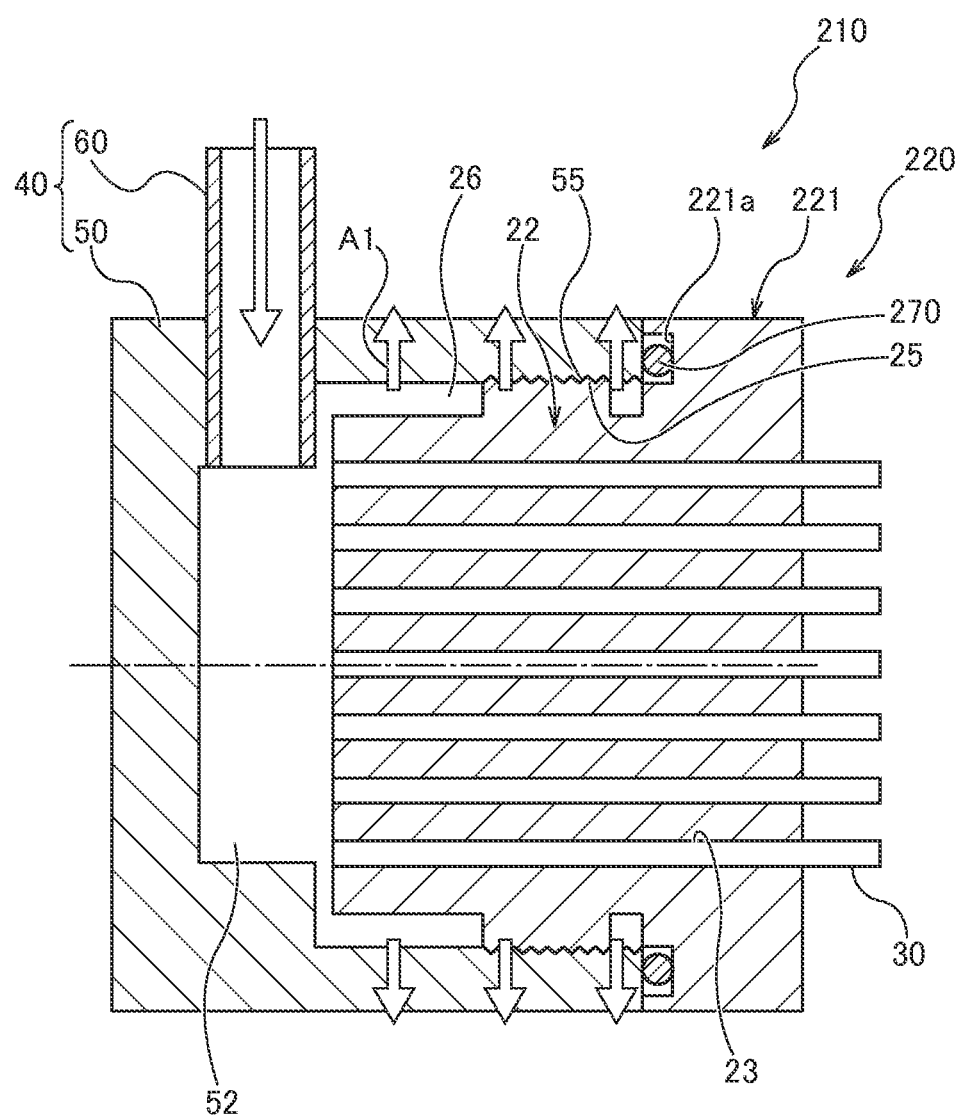
FIG. 5 is a sectional view schematically showing a connecting apparatus as a comparative example.

FIG. 5 shows a connecting apparatus 210 as a comparative example. In the connecting apparatus 210, the area between a boss 220 and the body portion 50 is sealed with only an O-ring 270 disposed closer to the boss side than the first and second threads 25 and 55. More specifically, the seal is formed by an O-ring 270 disposed in an O-ring groove 221a formed in an end surface of a first part 221 located closer to the boss side than the second part 22. In this comparative example, the liquid flows into the intermediate space 26 from the internal space 52, and the radial hydraulic pressure of the liquid entering the intermediate space 26 causes the body portion 50 to be expanded radially outward, as shown by the arrow A1. Therefore, it becomes likely that the first thread 25 and the second thread 55 will be disconnected from each other.

B. Second Embodiment

Figure 6:
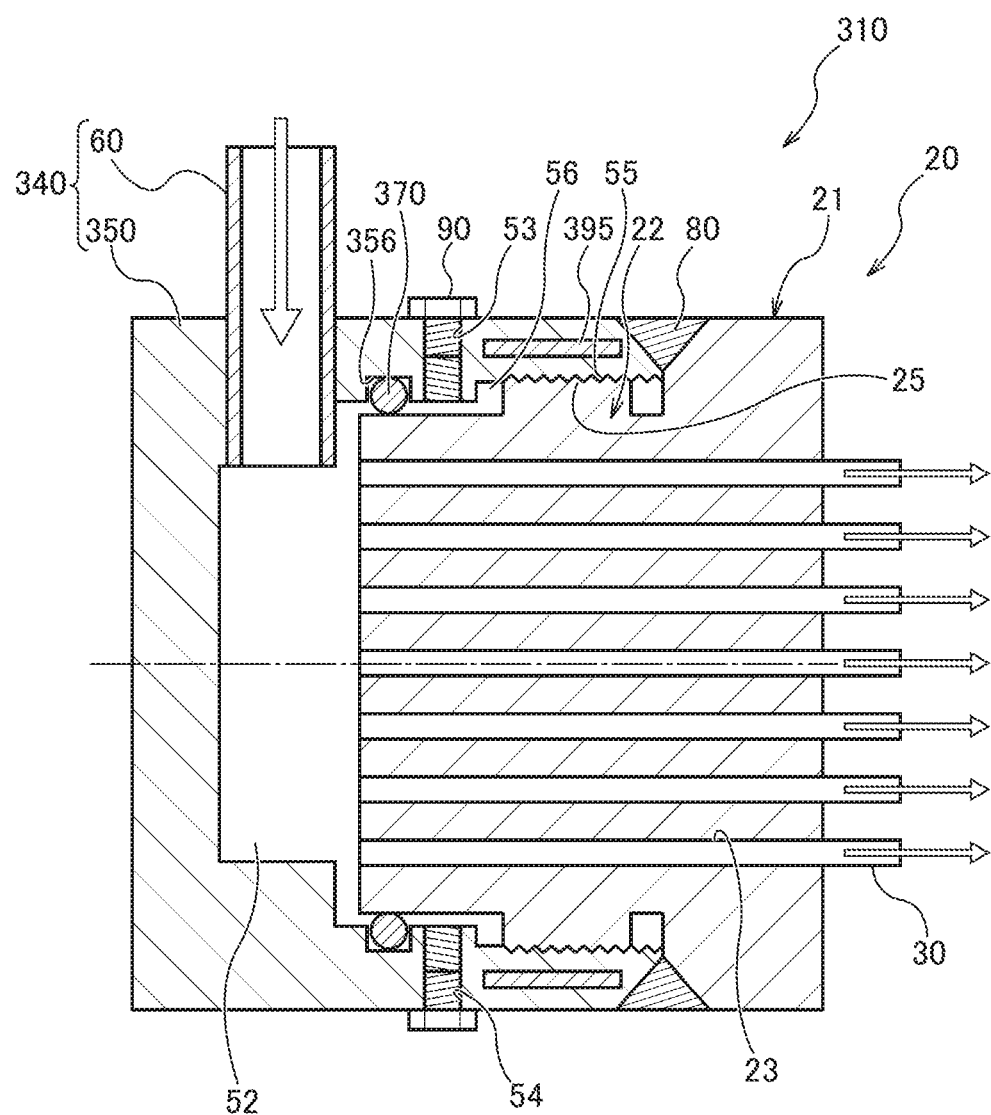
FIG. 6 is a sectional view schematically showing a connecting apparatus as a second embodiment of the present invention.

FIG. 6 is a schematic sectional view of a connecting apparatus 310 as a second embodiment of the present invention. In FIG. 6, the same elements as those of the first embodiment (FIG. 2) are denoted by the same reference numerals as used in FIG. 2. The connecting apparatus 310 will be explained below with regard to only the points in which the second embodiment differs from the first embodiment. The second embodiment differs from the first embodiment in that the connecting apparatus 310 has a first seal structure 370 in place of the first seal structure 70, and that the connecting apparatus 310 has a reinforcing member 395.

The first seal structure 370 is an O-ring disposed in an O-ring groove 356 formed in the inner peripheral surface of a body portion 350. That is, the first seal structure 370 is disposed between the boss 20 and the body portion 350 in a direction perpendicular to the predetermined direction (the predetermined direction is the direction in which the boss 20 and the body portion 350 extend) to seal between the boss 20 and the body portion 350. With this configuration, it is unnecessary to press the first seal structure 70 in the predetermined direction in order to allow the first seal structure 70 to exhibit the sealing function as is necessary in the first embodiment (see FIG. 2). That is, in the first embodiment, the first seal structure 70 is pressed in the predetermined direction, and counterforce to the pressing force applied to the first seal structure 70 acts on the boss 20 from the first seal structure 70 toward the boss side. In contrast, the first seal structure 370 is free from the problem that the boss 20 may be subjected to such counterforce (the counterforce acts in the direction in which the boss 20 is separated from the body portion 350). Accordingly, it is possible to reduce the force acting in the direction for disconnecting the boss 20 and the body portion 350 from each other, so that the connection between the boss 20 and the body portion 350 becomes stronger. As a result, pressure resistance can be improved.

Moreover, because the first seal structure 370 is disposed closer to the coupler side than the first and second threads 25 and 55, the liquid cannot enter the space between the first and second threads 25 and 55 and the vicinity thereof from the internal space 52. Accordingly, the hydraulic pressure shown by the arrow A1 in FIG. 5 does not act on either of the first and second threads 25 and 55; therefore, it is possible to eliminate or reduce the likelihood of the boss 20 and the body portion 350 being disconnected from each other by the radially outward expansion of the second thread 55. Particularly, in this embodiment, the first seal structure 370 is provided in the vicinity of the coupler-side end portion of the boss 20. Therefore, the hydraulic pressure shown by the arrow A1 in FIG. 5 hardly acts on the body portion 350. Accordingly, the above-described advantage becomes remarkable.

The reinforcing member 395 is an annular member disposed in the side wall of the body portion 350. The reinforcing member 395 is formed using a material having a higher rigidity than the constituent material of the body portion 350. Examples of such a material are metal materials such as stainless steel. Using a metallic material makes it possible to obtain satisfactory rigidity even if the thickness of the reinforcing member 395 is reduced (e.g. 1 mm) and hence possible to reduce increase in size of the body portion 350. It should, however, be noted that the constituent material of the reinforcing member 395 is not limited to a metal but may be a resin material such as vinyl chloride. With the above-described configuration, even if the heat exchanger handles an acid or other corrosive liquid, it is possible to reduce development of corrosion in the reinforcing member 395. The reinforcing member 395 is provided to reinforce the rigidity of the body portion 350. With the described configuration, even if the liquid enters the intermediate space 26 from the internal space 52 as a result of the deterioration of the first seal structure 370, it is possible to eliminate or reduce the likelihood of the boss 20 and the body portion 350 being disconnected from each other by the radially outward expansion of the second thread 55 due to the hydraulic pressure shown by the arrow A1 in FIG. 5. Particularly, in this embodiment, the reinforcing member 395 is disposed in a region where the second thread 55 is formed in the predetermined direction; therefore, the reinforcing member 395 can work effectively.

Figure 7:
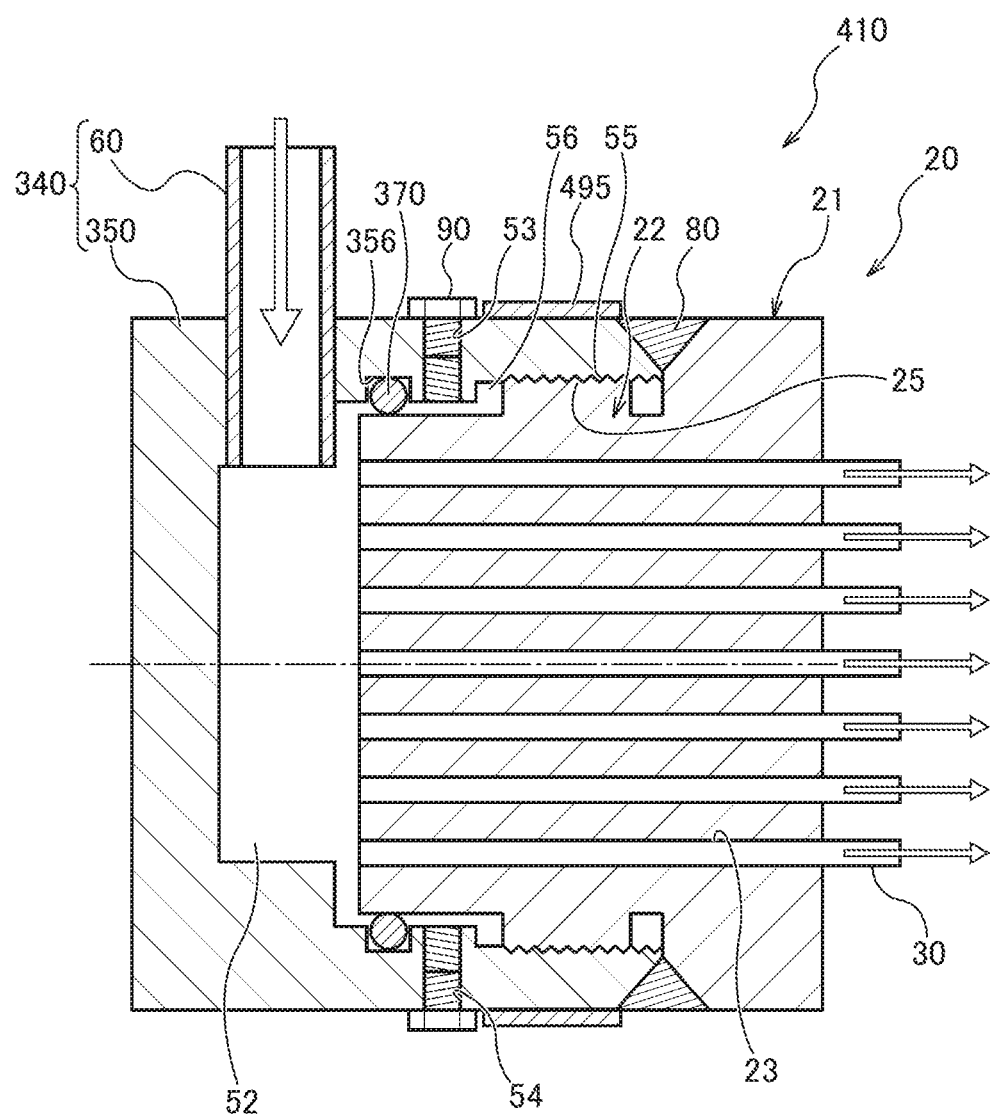
FIG. 7 is a sectional view schematically showing a connecting apparatus as a modification of the second embodiment.

FIG. 7 is a schematic sectional view of a connecting apparatus 410 as a modification of the second embodiment. In FIG. 7, the same constituent elements as those of the connecting apparatus 310 (FIG. 6) are denoted by the same reference numerals as used in FIG. 6. The connecting apparatus 410 differs from the connecting apparatus 310 only in that the connecting apparatus 410 has a reinforcing member 495 in place of the reinforcing member 395. The reinforcing member 495 is disposed around the outer periphery of the body portion 350 by being fitted to the body portion 350. The connecting apparatus 410 with this configuration can offer the same advantages as those of the connecting apparatus 310. In addition, the connecting apparatus 410 can be manufactured more easily than the connecting apparatus 310.

C. Modifications

C-1. First Modification

The second seal structure 80 may be a seal structure using a seal member in place of the full-circle welding. For example, the O-ring 270 shown in FIG. 5 may be used as the second seal structure 80. Such an alternative configuration also allows the seal reliability to be improved by the dual seal structure and enables the above-described inspection of sealing performance.

C-2. Second Modification

When the second seal structure 80 is a weld formed by full-circle welding, the connecting apparatus need not always have the first thread 25 and the second thread 55. In other words, the boss and the body portion need not always be connected by threaded engagement. Even with such an alternative configuration, the connection between the boss and the body portion is ensured by full-circle welding.

Although the embodiments of the present invention have been described above based on some examples, the described embodiments are for the purpose of facilitating the understanding of the present invention and are not intended to limit the present invention. The present invention may be modified and improved without departing from the spirit thereof, and the invention includes equivalents thereof. In addition, the elements described in the claims and the specification can be arbitrarily combined or omitted within a range in which the above-mentioned problems are at least partially solved, or within a range in which at least a part of the advantages is achieved.

This application claims priority on Patent Application No. 2013-221856 filed in Japan on Oct. 25, 2013, the disclosure of which is hereby incorporated by reference herein in its entirety.

What is claimed is:

1. A flow passage connecting apparatus for a heat exchanger, the connecting apparatus comprising: a boss formed of a resin material in a columnar shape extending in one direction, the boss having a plurality of through-holes for each receiving one end of a heat exchanger tube made of a resin material; a coupler made of a resin material, the coupler having a body portion formed in a circular cylindrical shape extending in the one direction, the body portion being configured to receive therein a part of the boss and to be connected to the boss; a first seal structure sealing between the boss and the body portion; and a second seal structure sealing between the boss and the body portion, wherein the boss and the coupler define a flow passage of the flow passage connecting apparatus, and a positional relationship between the boss and the coupler along the one direction defines a boss side and a coupler side of the flow passage, wherein the first seal structure is at a position closer to the coupler side of the flow passage than the second seal structure, wherein the body portion of the coupler has a communication hole for inspecting the sealing performance of the first and second seal structures, the communication hole being formed at a position between the first seal structure and the second seal structure to communicate between an inside and outside of the connecting apparatus, wherein the body portion of the coupler further includes a tube inlet for receiving a tube portion such that the tube portion and the plurality of through-holes communicate with each other through an internal space of the body portion, the tube inlet being formed at a position where the tube inlet opens directly into the coupler side of the flow passage, wherein the tube inlet and the communication hole are longitudinally offset along the one direction, wherein the boss has a first thread formed on an outer surface thereof, and the body portion has a second thread formed on an inner surface thereof, the second thread being thread-engaged with the first thread when the body portion receives the part of the boss, and wherein the first thread and second thread are positioned between the first seal structure and the second seal structure.

2. The connecting apparatus of claim 1, wherein the first seal structure has a seal member disposed between the body portion and an end surface of the boss.

3. The connecting apparatus of claim 1, wherein the first seal structure has a seal member disposed between the body portion and the boss in a direction perpendicular to the one direction.

4. The connecting apparatus of claim 1, wherein the first seal structure has a seal member disposed between the body portion and the boss in a direction perpendicular to the one direction, and the first seal structure is disposed closer to the coupler side than the first thread and the second thread.

5. The connecting apparatus of claim 1, further comprising:
an annular reinforcing member provided at least one of in the body portion and around an outer periphery of the body portion to reinforce rigidity of the body portion.

6. The connecting apparatus of claim 1, wherein the communication hole includes a first communication hole and a second communication hole; and
the first communication hole and the second communication hole are formed at circumferentially different positions, respectively.

7. The connecting apparatus of claim 1, wherein the connecting apparatus further includes a plug that is removably inserted into the communication hole.

8. A flow passage connecting apparatus for a heat exchanger, the connecting apparatus comprising: a boss formed of a resin material in a columnar shape extending in one direction, the boss having a plurality of through-holes for each receiving one end of a heat exchanger tube made of a resin material; a coupler made of a resin material, the coupler having a body portion formed in a circular cylindrical shape extending in the one direction, the body portion being configured to receive therein a part of the boss and to be connected to the boss; a first seal structure sealing between the boss and the body portion; and a second seal structure sealing between the boss and the body portion, wherein the boss and the coupler define a flow passage of the flow passage connecting apparatus, and a positional relationship between the boss and the coupler along the one direction defines a boss side and a coupler side of the flow passage, wherein the first seal structure is at a position closer to the coupler side of the flow passage than the second seal structure, wherein the body portion of the coupler has a communication hole for inspecting the sealing performance of the first and second seal structures, the communication hole being formed at a position between the first seal structure and the second seal structure to communicate between an inside and outside of the connecting apparatus, wherein the body portion of the coupler further includes a tube inlet for receiving a tube portion such that the tube portion and through-holes communicate with each other through an internal space of the body portion, the tube inlet being formed at a position where the tube inlet opens directly into the coupler side of the flow passage, wherein the second seal structure is a structure in which the boss and the body portion are joined by full-circle welding, wherein the tube inlet and the communication hole are longitudinally offset along the one direction, wherein the boss has a first thread formed on an outer surface thereof, and the body portion has a second thread formed on an inner surface thereof, the second thread being thread-engaged with the first thread when the body portion receives the part of the boss, and wherein the first thread and second thread are positioned between the first seal structure and the second seal structure.

9. The connecting apparatus of claim 8, wherein the first seal structure has a seal member disposed between the body portion and an end surface of the boss.

10. The connecting apparatus of claim 9, wherein the first seal structure has a seal member disposed between the body portion and the boss in a direction perpendicular to the one direction.

11. The connecting apparatus of claim 8, wherein the first seal structure has a seal member disposed between the body portion and an end surface of the boss.

12. The connecting apparatus of claim 8, wherein the connecting apparatus further includes a plug that is removably inserted into the communication hole.

* * * * *